United States Patent
Vos et al.

(10) Patent No.: US 12,488,069 B2
(45) Date of Patent: Dec. 2, 2025

(54) CONTENT LICENSING PLATFORM, SYSTEM, AND METHOD

(71) Applicant: Datavault AI Inc., Beaverton, OR (US)

(72) Inventors: Bryan Vos, Clifford (CA); Nathan Finochio, New York, NY (US); Joel Auge, Millgrove (CA); Steven Bosman, Hanover (CA); Joel Koops, Guelph (CA); Joel Houston, Purchase, NY (US)

(73) Assignee: DATAVAULT AI INC., Beaverton, OR (US)

( * ) Notice: Subject to any disclaimer, the term of this patent is extended or adjusted under 35 U.S.C. 154(b) by 0 days.

(21) Appl. No.: 16/136,580

(22) Filed: Sep. 20, 2018

(65) Prior Publication Data
US 2019/0155997 A1    May 23, 2019

Related U.S. Application Data

(60) Provisional application No. 62/588,047, filed on Nov. 17, 2017.

(51) Int. Cl.
*G06F 21/10* (2013.01)
*G06Q 30/0283* (2023.01)

(52) U.S. Cl.
CPC ....... *G06F 21/105* (2013.01); *G06Q 30/0283* (2013.01); *G06Q 2220/10* (2013.01)

(58) Field of Classification Search
CPC ... G06F 21/105; G06F 16/68; G06Q 30/0283; H04L 9/0637
USPC .......................................................... 705/59
See application file for complete search history.

(56) References Cited

U.S. PATENT DOCUMENTS

| | | | |
|---|---|---|---|
| 7,885,894 B2 | 2/2011 | Shimoji et al. | |
| 8,060,443 B2 | 11/2011 | Gordon et al. | |
| 8,719,171 B2 | 5/2014 | Bourne et al. | |
| 10,192,250 B1 * | 1/2019 | Christensen | G06Q 20/123 |
| 2005/0119977 A1 | 6/2005 | Raciborski | |
| 2009/0063350 A1 | 3/2009 | Briggs et al. | |
| 2014/0351096 A1 * | 11/2014 | Radziwon | G06Q 30/0645 |
| | | | 705/26.81 |
| 2016/0189258 A1 * | 6/2016 | Ballesteros | G06Q 20/3227 |
| | | | 705/26.35 |
| 2017/0116693 A1 * | 4/2017 | Rae | H04L 9/3236 |
| 2017/0116694 A1 * | 4/2017 | Gabie | G06Q 50/188 |

(Continued)

FOREIGN PATENT DOCUMENTS

| | | |
|---|---|---|
| EP | 1465040 A3 | 11/2005 |
| EP | 1630998 A1 | 3/2006 |

(Continued)

*Primary Examiner* — Courtney P Jones
(74) *Attorney, Agent, or Firm* — Goodhue, Coleman & Owens, P.C.

(57) ABSTRACT

Illustrative embodiments provide a system, method, platform, and block chain network for performing content licensing. Copyright information associated with content is received. A digital representation of the content is received. A digital representation of the content is received. One or more secure identifiers is assigned to the content. A content library and a blockchain ledger with the content and associated one or more secure identifiers are updated. Licenses and transactions are implemented for the content. The licenses and transactions are recorded in the blockchain ledger.

19 Claims, 6 Drawing Sheets

(56) References Cited

U.S. PATENT DOCUMENTS

| | | | | |
|---|---|---|---|---|
| 2017/0206523 | A1* | 7/2017 | Goeringer | G06Q 20/409 |
| 2017/0243216 | A1* | 8/2017 | Kohn | H04L 9/3236 |
| 2018/0039942 | A1* | 2/2018 | Rogers | G06F 16/2379 |
| 2018/0068091 | A1* | 3/2018 | Gaidar | G06F 21/10 |
| 2018/0121635 | A1* | 5/2018 | Tormasov | H04L 9/3236 |
| 2018/0158162 | A1* | 6/2018 | Ramasamy | H04L 9/14 |
| 2018/0255333 | A1* | 9/2018 | Soylu | H04N 21/4627 |
| 2018/0285996 | A1* | 10/2018 | Ma | H04L 9/3297 |
| 2018/0294957 | A1* | 10/2018 | O'Brien | H04L 9/0643 |
| 2018/0322259 | A1* | 11/2018 | Solow | H04L 9/0819 |
| 2018/0349572 | A1* | 12/2018 | Chen | G06Q 30/018 |
| 2018/0374173 | A1* | 12/2018 | Chen | G06Q 50/184 |
| 2018/0374460 | A1* | 12/2018 | Bradley | G10H 1/40 |
| 2019/0057115 | A1* | 2/2019 | Liu | H04L 9/3263 |
| 2019/0082224 | A1* | 3/2019 | Bradley | G06Q 30/0282 |
| 2019/0102782 | A1* | 4/2019 | Diehl | G06F 21/16 |
| 2019/0130033 | A1* | 5/2019 | Baumgardner | G06F 16/68 |
| 2019/0280856 | A1* | 9/2019 | Yeap | G06Q 50/184 |
| 2019/0339678 | A1* | 11/2019 | Biernat | G05B 19/41865 |
| 2019/0384892 | A1* | 12/2019 | Holland | G06F 21/105 |
| 2020/0143367 | A1* | 5/2020 | LeBeau | G06Q 20/3829 |
| 2020/0160466 | A1* | 5/2020 | Hori | G06F 16/27 |

FOREIGN PATENT DOCUMENTS

| | | | | |
|---|---|---|---|---|
| EP | 1378811 | A3 | 11/2006 | |
| WO | 2001084439 | A1 | 11/2001 | |
| WO | 2007059499 | A3 | 8/2008 | |
| WO | 2008115647 | A1 | 9/2008 | |
| WO | 2008033799 | B1 | 10/2008 | |
| WO | 2009071736 | A1 | 6/2009 | |
| WO | WO-2015175566 | A1 * | 11/2015 | G06F 17/30 |
| WO | 2017079561 | A1 | 5/2017 | |
| WO | WO-2019223373 | A1 * | 11/2019 | |

* cited by examiner

CONTENT METADATA 500

METADATA 502
- Publisher
- Copyright information
- The International Standard Recording Code (ISRC)
- Writer
- Performers
- Solo Artist
- Composers
- Producer
- Engineer
- Song title
- Album title
- Release year
- Genre
- Track number
- Year released
- Lyrics
- Key of song
- Length of song
- Rhythm
- Chords
- Chord progressions
- Beats per min
- Album art

FIG. 5

CONTENT LICENSING PLATFORM, SYSTEM, AND METHOD

RELATED APPLICATIONS

This application claims the priority benefit of U.S. Application Ser. No. 62/588,047 filed Nov. 17, 2017 which is hereby claimed and incorporated by reference in its entirety.

BACKGROUND

I. Field of the Disclosure

The illustrative embodiments relate to licensing content. More specifically, but not exclusively, the illustrative embodiments relate to licensing content created by artists and others to automate the licensing process and revenue generation.

II. Description of the Art

Creation of unique content has grown exponentially in recent years. The growth in new content is fostered by new technologies, devices, creative mediums, and digitization processes. In many cases, it is difficult for individuals, organizations, and entities to monetize their content. It is even more difficult to ensure that their content is licensed, monetized, and distributed properly when put out into the world.

SUMMARY

Illustrative embodiments provide a system, method, platform, and block chain network for performing content licensing. Copyright information associated with content may be received. A digital representation of the content may be received. A digital representation of the content may be received. One or more secure identifiers may be assigned to the content. A content library and a blockchain ledger with the content and associated one or more secure identifiers may be updated. Licenses and transactions are implemented for the content. The licenses and transactions are recorded in the blockchain ledger. Another system provides a server or blockchain device including a processor for executing a set of instructions and a memory for storing the set of instructions. The set of instructions are executed by the processor to perform the method herein described. A server, platform, or other device may also implement the method herein described.

Another embodiment provides a system for performing content licensing. A number of electronic devices execute a content application. The content application is configured to upload content and licensing information associated with the content. The system includes a platform accessible by the number of electronic devices executing the content application through one or more networks. The platforms receives copyright information associated with content, assigns one or more secure identifiers to the content, updates a content library and a blockchain ledger with the content, the one or more secure identifiers, and metadata associated with the content, implements licenses and transactions for the content, and records the licenses and transactions in the blockchain ledger.

In one embodiment, the one or more secure identifiers may include an inaudible tone integrated in the content. The secure identifiers may also be integrated into multiple portions of the content. The method may also include searching one or more environments for the secure identifier to ensure compliance with the license for the content. The method may also organize metadata of the content into a unique string. The method may also create a secure identifier and metadata string for each license. The method may also save the secure identifier and the metadata string with the content in the block chain ledger. The method may also facilitate a copyright filing for the content. In one embodiment, the inaudible tone may store content metadata. A pricing algorithm may be utilized to provide a price for the user. The secure identifier may represent a digital fingerprint associated with the content.

BRIEF DESCRIPTION OF THE DRAWINGS

Illustrated embodiments are described in detail below with reference to the attached drawing figures, which are incorporated by reference herein, and where:

FIG. 5 is a pictorial representation of a user interface for reviewing content metadata in accordance with an illustrative embodiment.

DETAILED DESCRIPTION OF THE DISCLOSURE

Figure 1:
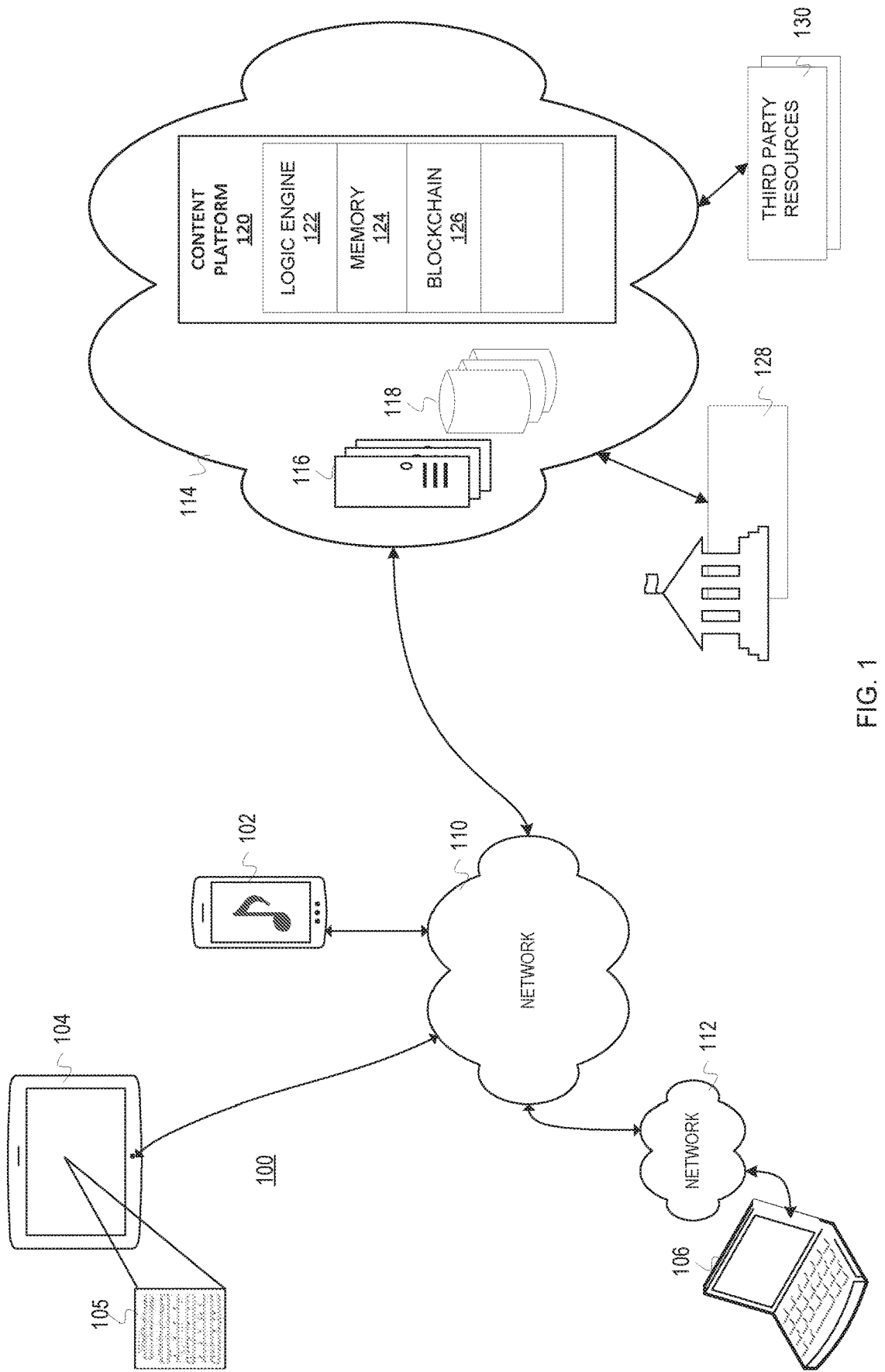
FIG. 1 is a pictorial representation of a system 100 for managing content and licensing in accordance with an illustrative embodiment.

The illustrative embodiments provide a content licensing platform, system and method. The content licensing platform allows creators (e.g., artists, inventors, etc.) to manage, register, verify, license, track, and monetize their content. The content may be protected by applicable federal and common law copyright laws and other applicable laws and registrations. In other embodiments, the content may also be protected by trademarks, patents, contractually, or so forth. The content may include songs, audio, performances, records, pictures (e.g., an individual's likeness, scenery, still-images, etc.), video, compilations, compositions/written content, drawings, digital content, sheet music, tablature, or other original content. In other embodiments, the content may also include software modules or programs. The illustrative embodiments track and manage how, when, and where content is used, such as playback of a song.

The illustrative embodiments are particularly beneficial to musicians, artists, singers, songwriters, composers, bands, vocal groups, entertainers, DJs, comedians, spoken word artists, church ensembles, writers, photographers, bloggers, social media writers, and all owners of original content (hereinafter referred to as "users" or "content creators" for purposes of simplicity) that may seek to copyright, share, distribute, or license their content.

The illustrative embodiments allow users and managers to determine/gather, access, and manage information about how and where content is used. In one embodiment, inaudible tones within the content may be utilized to communicate the content information that may be managed through a block chain system and network. For example, inaudible tones may be utilized to communicate information regarding utilization to update a block chain ledger associated with the user and/or content generator.

The illustrative embodiments provide mechanical licensing rights management and tracking for content creators. For example, the platform may manage mechanical licensing rights in which the user may distribute less than 2,500 units of a physical or digital format (e.g., permanent digital downloads, ringtones, etc.) or a tiered license fee for users that need to license up to 10,000 interactive streams. The illustrative embodiments may allow for compulsory mechanical licensing rights which enables copyright owners who license their content to be covered or reproduced by another artist the ability to efficiently receive and process royalty splits as well as additional licensing. In one embodiment, the illustrative embodiments may utilize blockchain technology. Blockchain is an incorruptible digital ledger of transactions.

The illustrative embodiments also provide compulsory licensing rights which enables copyright owners who license their content to be covered or reproduced by another artist the ability to efficiently receive royalties and pay out royalty splits through blockchain transactions The illustrative embodiments offer performance, composition, synchronization, and micro licensing rights management tracking for registration of applicable licenses which gives third-party users the ability to license the rights to copy, reproduce, distribute, and perform the content or material as desired. For example, the content platform may efficiently track content information to accurately pay out royalty splits through blockchain for each managed and tracked performance licensing rights contract. As a result, the original content may be utilized (e.g. with compensation) to generate new content, derivations, advertisements, backgrounds, videos, covers, or so forth.

Any number of ambient, passive, or active monitoring technologies may be utilized to ensure compliance with the applicable licensing structure (e.g., payments, quantity, etc.). As indicated, inaudible tones, block chain, secure identifiers, a digital rights management platform, software, and applications, may be utilized to manage the content and associated information. Crowdsourcing-based monitoring through communications or computing devices may be performed. In some embodiments, participants may be compensated for their participation, bandwidth, device utilization, or so forth.

The illustrative embodiments may be implemented utilizing any number specialized devices and processes. The description and Figures (including methods, steps, processes, functions, components, etc.) may be combined or modified in any number of combinations. The various embodiments may be combined without restriction whether naturally or artificially imposed. The illustrative embodiments address the very real problem of licensing content, such as songs, videos, ringtones, or other common types of digital content. Without effective and automated licensing systems, devices, and methods as are herein described many content generators are unable to effectively monetize their content stifling creativity and the free flow of commerce. The illustrative embodiments may allow for automatic or nearly automatic licensing based on information applicable to the content creators and consumers.

The illustrative embodiments do not relate to abstract ideas, but rather content management, licensing, and transactions. This is particularly important for content creators/individuals with little licensing power, resources, or contacts. The object is to help content creators specify the terms and conditions for performing automatic licensing with revenue from transactions (e.g., through mobile applications, web browsers, platforms, etc.) be returned to the content creator with a very small fee or percentage compensating the platform service provider. The illustrative embodiments require managing content, consumers/licensees/distributors, and user information and utilizing all in new and unique ways for the benefit of targeted audiences as well as the general public utilizing servers, databases, browser extensions, add-ins, and tools, mobile applications, and electronic distribution systems. The illustrative embodiments may be implemented by specific and customized devices, logic, software, or a combination thereof. In some embodiments, physical content, audio, video, or happenings may be automatically scanned or converted to digital content so that the processes herein described may be implemented.

The illustrative embodiments may be applied across the Figures and description without limitation or restriction. It is expected that some steps and processes may be rearranged and reordered and that well known processes and techniques may be combined with those concepts herein described.

FIG. 1 is a pictorial representation of a system 100 for managing content and licensing in accordance with an illustrative embodiment. In one embodiment, the system 100 of FIG. 1 may include any number of devices 101, networks, components, software, hardware, and so forth. The system 100 may be utilized by one or more service providers, content providers, users, and so forth. In one example, the system 100 may include a smart phone 102, a tablet 104 displaying graphical user interface 105, a laptop 106 (altogether devices 101), a network 110, a network 112, a cloud system 114, servers 116, databases 118, a content platform 120 including at least a logic engine 122 and a memory 124. The cloud system 114 may further communicate with sources 128 and third-party resources 130.

Each of the devices, systems, and equipment of the system 100 may include any number of computing and telecommunications components, devices or elements which may include processors, memories, caches, busses, motherboards, chips, traces, wires, pins, circuits, ports, interfaces, cards, converters, adapters, connections, transceivers, displays, antennas, operating systems, kernels, modules, scripts, firmware, sets of instructions, and other similar components and software that are not described herein for purposes of simplicity. For example, the devices of the system 100 may utilize a common software package (e.g., programs, mobile applications, etc.) to perform the methods, functions, and processes herein described.

In one embodiment, the system 100 may be utilized by any number of users, organizations, or providers to aggregate, manage, license, review, analyze, process, and distribute creative content. In one embodiment, the creative content represents music, works of art, software, that may be uploaded through the devices 101 or that remain in a physical form that is not uploadable. In one embodiment, the system 100 may utilize any number of secure identifiers (e.g., passwords, pin numbers, certificates, digital identifiers/biometrics, etc.), secure channels, connections, or links, virtual private networks, biometrics, or so forth to secure the content and process applicable transactions. The devices 101 are representative of multiple devices that may be utilized to create or communicate content. The devices 101 utilize any number of applications, browsers, gateways, bridges, or interfaces to communicate with the cloud system 114 and associated components.

The wireless device 102, tablet 104, and laptop 106 are examples of common devices that may be utilized to view, listen to, or otherwise interact with communications or content. Other examples of devices 101 may include cameras, video cameras, audio systems, gaming devices, vehicle systems, art systems, televisions, smart displays, monitors, entertainment devices, medical devices, virtual reality/augmented reality systems, or so forth. The devices 101 may communicate wirelessly or through any number of fixed/hardwired connections, networks, signals, protocols, formats, or so forth. In one embodiment, the smart phone 102 is a cell phone that communicates with the network 110 through a 5G connection. The laptop 106 may communicate with the network 112 through an Ethernet or Wi-Fi connection. The illustrative embodiments may be utilized to play content, pause playback, skip content, generate playlists or organize content, rate/rank content, manage content, edit content, or so forth as are known in the art.

The cloud system 114 may aggregate, manage, analyze, and process content and user requests across the Internet and any number of networks, sources 128, and third-party resources 130. For example, the networks 110, 112, 114 may represent any number of public, private, virtual, specialty, or other network types or configurations. The different components of the system 100, including the devices 101 may be configured to communicate using wireless communications, such as Bluetooth, Wi-Fi, or so forth. Alternatively, the devices 101 may communicate utilizing satellite connections, Wi-Fi, WiMAX, 3G, 4G, 5G, LTE, personal communications systems, DMA wireless networks, and/or hardwired connections, such as fiber optics, T1, cable, DSL, high speed trunks, powerline communications, and telephone lines. Any number of communications architectures including client-server, network rings, peer-to-peer, n-tier, application server, mesh networks, fog networks, or other distributed or network system architectures may be utilized. The networks, 110, 112, 114 of the system 100 may represent a single communication service provider or multiple communications services providers.

The sources 128 may represent any number of web servers, distribution services (e.g., text, email, video, etc.), media servers, platforms, distribution devices, or so forth. In one embodiment, the sources 128 may represent the copyright office. In some cases, the cloud system 114 may facilitate a copyright registration. In one embodiment, the cloud system 114 (or alternatively the cloud network) including the content platform 120 is specially configured to perform the illustrative embodiments.

The cloud system 114 or network represents a cloud computing environment and network utilized to aggregate, process, manage, license, and distribute content. The cloud system 114 allows content from multiple users, managers, or service providers to be centralized. In addition, the cloud system 114 may remotely manage configuration, software, and computation resources for the devices of the system 100, such as devices 101. The cloud system 114 may prevent unauthorized access to data, tools, and resources stored in the servers 116, databases 118, and well as any number of associated secured connections, virtual resources, modules, applications, components, devices, or so forth. In addition, a user may more quickly upload, aggregate, process, manage, license and distribute content, where authorized, utilizing the cloud resources of the cloud system 114 and content platform 120. In addition, the cloud system 114 allows the overall system 100 to be scalable for quickly adding and removing users, content providers, analysis modules, moderators, programs, scripts, filters, transaction processes, distribution partners, or other users, devices, processes, or resources. Communications with the cloud system 114 may utilize encryption, secure tunnels, handshakes, secure identifiers (e.g., passwords, pins, keys, scripts, biometrics, etc.), firewalls, specialized software modules, or other data security systems and methodologies as are known in the art.

Although not shown, the cloud system 114 may include any number of load balancers. The load balancer is one or more devices configured to distribute the workload of processing the content from multiple users to optimize resource utilization, throughput, and minimize response time and overload. For example, the load balancer may represent a multilayer switch, database load balancer, or a domain name system server. The load balancer may facilitate communications and functionality (e.g. database queries, read requests, write requests, command communications, stream processing, etc.) between the devices 101 and the cloud system 114. Other intelligent network devices may also be utilized within the cloud system 114.

The servers 116 and databases 118 may represent a portion of the content platform 120. In one embodiment, the servers 116 may include a web server 117 utilized to provide a website and user interface (e.g., user interface 107) for interfacing with numerous users. Information received by the web server 117 may be managed by the content platform 120 managing the servers 116 and associated databases 118. For example, the web server 117 may communicate with the database 118 to respond to read and write requests. The databases 118 may utilize any number of database architectures and database management systems (DBMS) as are known in the art. The databases 118 may store the content associated with each user which may specify an address, name, age, biometric identifiers, location, content restrictions, licensing restrictions and terms, and so forth. Any number of secure and/or unique identifiers, such as inaudible tones, QR codes, serial numbers, digital biometrics, or so forth may be utilized to ensure that content, personal, or transaction information is not improperly shared or accessed.

The user interface 105 may be made available through the various devices 101 of the system 100. In one embodiment, the user interface 105 represents a graphical user interface, audio interface, or other interface that may be utilized to create, manage, license, and distribute content. The graphical user interface 105 may be presented based on execution of one or more mobile applications, programs, browsers, kernels, modules, scripts, operating systems, or specialized software that is executed by one of the respective devices 101. The user interface may display current/real-time and historical data as well as trends, projections, and forecasts. The user interface 105 may be utilized to set the user preferences, parameters, and configurations of the devices 101 as well as upload and manage the content sent to the cloud system 114.

In one embodiment, the system 100 or the cloud system 114 may also include the content platform 120 which is one or more devices utilized to enable, initiate, aggregate, analyze, process, route, license, and manage content and communications with one or more communications or computing devices. The content platform 120 may include one or more devices networked to manage the cloud network and system 114. For example, the content platform 120 may include any number of servers, routers, switches, or advanced intelligent network devices. For example, the content platform 120 may represent one or more specialized web servers that performs the processes and methods herein described. The content platform 120 may track and manage how, when, and where content is used, such as playback of a song or video or utilization of a still image.

In one embodiment, the logic engine 122 is the logic that controls various algorithms, programs, hardware, and software that interact to receive, aggregate, analyze, rank, process, license, and distribute content, alerts, reports, messages, or so forth. The logic engine 122 may utilize any number of thresholds, parameters, criteria, algorithms, instructions, or feedback to interact with users and interested parties and to perform other automated processes.

In one embodiment, cloud system 114 or the content platform 120 may coordinate the methods and processes described herein as well as software synchronization, communication, and processes. For example, the cloud system 114 and the content platform 120 may implement all or portions of a block chain network for managing the content and licenses associated with the content. The third-party resources 130 may represent any number of resources utilized by the cloud system 114 including, but not limited to, government databases, private databases, web servers, research services, and so forth.

In one embodiment, the content platform 120 may implement a blockchain 126 ledger, manager, or technology. In another embodiment, the blockchain ledger may be accessible through sources 128. Any number of existing blockchain companies or providers may be utilized (Aetemity, Ethereum, Bitcoin, Dfinity, ContentKid, Blockphase, Chain of Things, Flowchain, Decissio, Cognate, SkyHive, Safe, etc.).

The blockchain 126 is utilized as a way to store and record all original content as well as updates based on licenses or so forth. The blockchain 126 may utilized one or more distinct ledgers for different entities, services providers, types of content, or so forth. Each new content received by the content platform 120 is assigned a secure identifier. In one embodiment, the secure identifier is an inaudible tone or other key that may be integrated into the content for securing, managing, and authenticating the content. The new content may also have an inherent identifier or digital fingerprint. The blockchain 126 may cross-reference updates to the content with the original record for the content to ensure proper licensing, management, and transactions. In one example, different licensing tiers, pricing algorithms, license verification, inaudible tone verification, and royalty payments are combined to create a unique song and licensing technology. The illustrative embodiments provide a unique smart contract-based licensing, management, tracking, and enforcement technology that allows owners, artists, performers, musicians, and other content creators to benefit from the monetization of their content utilizing agreed upon license rates or royalties.

The blockchain 126 may also utilize any number of payment systems (e.g., PayPal, Venmo, Square, wire transfers, credit cards, Quicken, etc.) to distribute money to parties that split payments (e.g., licensing fees, royalties, etc.), such as teams, musician groups, distributors, advertisers, producers, songwriters, agents, and so forth.

In one embodiment, the content platform 120 may be utilized to perform mechanical licensing rights. For example, content, such as musical compositions, may be licensed for use on CDs, records, tapes, digital configurations (e.g., downloads, ringtones, etc.), and so forth. Content owners may license content and the platform may assign an inaudible tone to the licensed content that carries licenses and assignable rights (e.g., single user, groups of users, distributors, gift, etc.). The inaudible tone may also manage limited or variable advertisement network splits for 3rd party monetization rights. The artist or content owner may license content utilizing mechanical rights including sharing rights, upload rights, 3rd party licensing terms, and so forth. Content creators may elect for content to be freely uploaded and shared by 3rd parry users who are given full or partial payment of revenues (e.g., currency or cryptocurrency splits). In addition, parties may be compensated or otherwise rewarded for sharing, selling, marketing, or advertising content. Similarly, content owners may elect to limit or prevent any sharing of content through advertisement networks, $3^{rd}$ party monitoring and verification (e.g., inaudible tone monitoring), or so forth.

Users and distributors may manage sharing of content that they have rights to or manage. Ambient listening tools or active auditing processes and devices may be utilized to ensure that parties utilizing the content have received a license to use those rights. For example, the inaudible tones may be sampled utilizing one or more devices, such as an application utilized by a mobile phone. For example, a user may be compensated for allowing his device to periodically sample detected audio (e.g., music, ringtones, etc.) to ensure that the content has been properly licensed with the creator being compensated for the use of the content. In another example, an advertisement network may detect inaudible tones embedded in content to authenticate the content or the lack or improper inaudible tones to report or stop unauthorized content. The blockchain 126 may be utilized to track and pay out each percentage of master rights and revenue.

In another embodiment, the content platform 120 may be utilized to digitally reproduce a cover version of content. For example, a licensee pays a statutory fee and is issued a compulsory license that requires no permission.

The user may choose from a library of available content (permission is not required). The user may select content to be licensed. Next, the platform processes a price for the license based on each the quantity of derivative content. In one embodiment, the license may be granted based on the cover or derivate of the content that is generated.

In one embodiment, the block chain ledger tracks and pays a flat fee compulsory license prior to distribution. In another embodiment, the transactions for distribution or playback of the content may be tracked as performed. In one embodiment, an embedded secure identifier may provide a means for limiting the content to the purchased number of downloads, streams, performances, or so forth. For example, an inaudible tone may be utilized through devices, systems, or networks to track physical or digital derivatives of the content. The inaudible tone may be integrated as a part of the digital ledger utilized in the block chain system and network. Violations of the licensing terms may be reported to the content owner. In addition, any additional advertisement revenues from content that violates the terms of the license may be passed back to the content owner.

In another embodiment, the content platform 120 may manage performance licensing rights. In one example performance licensing rights may include a blanket license for pieces of content to cover public performances. The performances may include content played through speakers, live by an artist, radio station performances, business performances, and content played at concert venues, bars, nightclubs, sports arenas, bowling alleys, malls, shopping centers, amusement parks, colleges and universities, and so forth. The licensing terms may vary based on the venue, type of performance, frequency of performances, entrance fees, pre-negotiated rate, and other factors. A broadcast inaudible tone, location tag (e.g., playback linked with a user/device/equipment/GPS tag/address, etc.), performance beacon, or other information may indicate the licensing rights and licensing information for interested parties.

In one embodiment, the content platform 120 registers with public performance organizations (PROs) who collect publishing or performance royalties. The inaudible tone is embedded in the content as is disclosed herein. Any number of ambient, audit, or active listening systems may be utilized to determine when the content is utilized. As noted, the detection of the inaudible tone may indicate when a licensed song is played for tracking as a public performance.

In another embodiment, the content platform 120 may manage sync licensing rights. For example, the content platform 120 may manage $3^{rd}$ party licensee for utilization in television shows, movies, video advertisements, games, websites, or other visual media that may integrated the content.

In one embodiment, a user may seek to produce content for the purposes of monetization. The content may be provided by the content platform 120 in various content types (e.g., files, streaming, embedded content, etc.). The content platform 120 may assist the user as needed in obtaining licenses as needed (e.g., cover of a song, derivative work, etc.). In one embodiment, the content platform 120 may secure a pre-approved license. The user may select a range of monetization options including total downloads, views, time ranges, demographic viewing, platform (e.g., Soundtrak, YouTube, Spotify, SoundCloud, etc.) or so forth. The monetization may be tied to licensing or royalty processes that may be automatically implemented. Advertisement networks, programs, third party sites, and ambient listening technologies may utilize the secure identifiers to ensure that monetization of the content occurs based on playback, uploads/downloads, stream content, communication, views, or so forth. In one embodiment, ambient listening may be utilized as a nationwide tracking system (e.g., similar to Nielson ratings). To protect privacy, the applicable systems and processes may be designed to list only for inaudible tones, beacons, or tags as noted herein. Payments to the user may be predetermined and paid out through a blockchain contract during or as part of the distribution. The blockchain ledger may also track the payments of licensing fees and royalties according to the terms and thresholds of the contract.

The content platform 120 allows copyrighted content to be made available for micro license and monetization by the user or third-parties. As a result, the third-party may license all or a portion of the content. The content platform 120 may support large scale licensing as well as micro-licenses. In one embodiment, when a third-party elects to micro-license all or some portion of protected content, the content owner may determine each fee. In another embodiment, a licensing algorithm takes into account a fee structure for licensing. For example, where the licensed content is a song, the content platform 120 may utilize a single performance, verse, chorus, solo, instrumental, or other portion of the song. The licensing algorithm may also utilize factors that may include performance number, length of song used, term of the license, size of the potential audience, song popularity, known audience, sales records (e.g., iTunes, Android Store, etc.), total music streams (e.g., Spotify, Pandora, YouTube, etc.), downloads, Internet views, and other metrics associated with the song or potential distribution.

Figure 2:
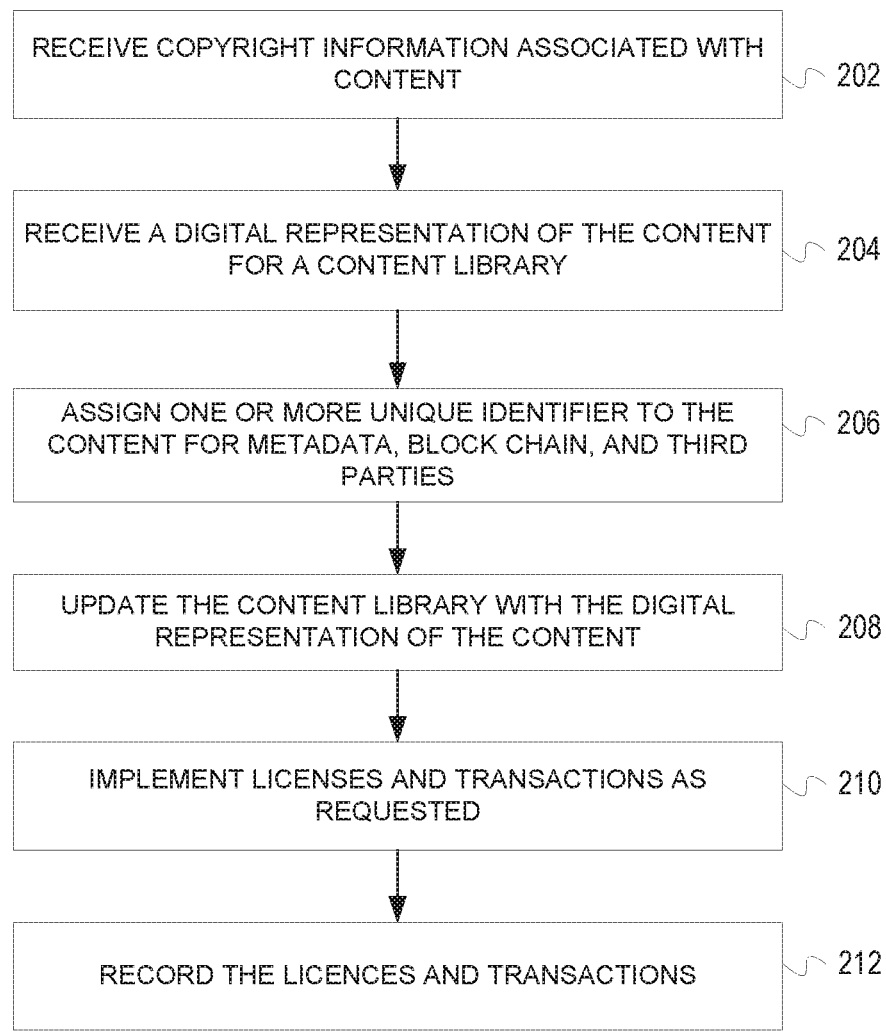
FIG. 2 is a pictorial representation of a flowchart for registering content for licensing through the content platform in accordance with an illustrative embodiment.

FIG. 2 is a pictorial representation of a flowchart for registering content for licensing through the content platform in accordance with an illustrative embodiment. The process may be implemented by a content platform, such as the content platform of FIG. 1 (or other systems, devices, and/or networks of FIG. 1). In one embodiment, the process may begin by receiving copyright information associated with content (step 202). As noted, the content may represent multiple different types of content. The content may be in the application, registration, or other portion of the copyright process. In one embodiment, the user may apply for copyright registration with the U.S. or the applicable Copyright Office. The content platform may also facilitate obtaining a copyright through an interactive web form and agent that submits the information from the interactive web form. For example, the agent may perform the copyright registration process in behalf of the content owner/assignee and provide relevant application information through the content platform.

Next, the content platform receives a digital representation of the content for a content library (step 204). The content may be uploaded by a user utilizing any number of computing or communications devices, such as a smart phone, laptop, personal computer, gaming device, sound system, digital recorder, tablet, or so forth. The digital content may be uploaded in any number of different file types, formats, or so forth. In one embodiment, the content is uploaded in different applicable formats for utilization by the platform in the licensing and distribution process.

Next, the content platform assigns one or more unique identifiers to the content for metadata, block chain, and third parties (step 206). In one embodiment, the identifier may represent a unique inaudible tracking tone that may be included in the content itself. The one or more unique identifiers may also include serial numbers, keys, embedded information (e.g., content creation date, content creator, content distributor, description, etc.), digital fingerprints, digital rights management, encryption, and so forth. The unique identifiers may also be generated from the content itself as analyzed by one or more programs or devices.

Next, the content platform updates the content library with the digital representation of the content (step 210). In one embodiment, a unique hash is utilized to update the blockchain ledger, databases, or other storage that secure the content. The digital representation of the content may be stored in one or more servers, databases, block chain ledgers, or applicable devices or constructs.

Next, the content platform implements the licenses and transactions (step 212). The licenses and transactions may include sales, licensing/royalty agreements, rentals/leases, streaming, or so forth. The license mays specify the terms and conditions under which the content may be utilized (e.g., number of users, playback, streams, times, dates, locations, allowed associations, broadcast/distribution types, types of content, etc.). A unique identifier may be utilized to identify each of the licenses or transactions.

Next, the content platform records the license and transactions. In one embodiment, the blockchain may be updated with the transaction information. The license and/or transaction may also be stored in a database, sales/management platform, or so forth.

In one embodiment, inaudible tones may be utilized as a means of tracking and verifying each time content is made available for licensing. The inaudible tone may be uniquely assigned to the content as metadata or other content associated information. The inaudible tone data is specific to the licensed content and used to verify the content copyright and the content license authority via the blockchain utilized by the content platform. The inaudible tone may include specific data points related to the content itself as well as metadata related to the license or license rights granted to an end-user, entity, or organization. For example, the data may specify the original author, date created, date uploaded, licensing or distribution rights granted, length of the material (if applicable), licensees, license date, right/limitations of the license, and so forth.

The inaudible tones, licensing data, and other corresponding data along with ambient listening technology gives content owners, television networks, radio networks, advertisement networks, sharing sites, third-party streaming sites, and others the ability to confirm and verify content as well as the corresponding license, authorizations, and authenticity. In one embodiment, the lack or improper inclusion of inaudible tone data, improper content metadata, or licensing data may indicate that content is not properly licensed and should be flagged, removed, reported, or advertisement revenue attributed to the proper author or copyright owner. The inclusion and utilization of a unique embedded identifier, such as a verifiable inaudible tone, along with block chain based cross referencing makes copyright enforcement, licensing management, transaction processing, and similar processes more efficient for content owners, license source, and distributors.

In one embodiment, the copyrighted content is registered to the system/platform through the process of uploading content. For example, a unique inaudible tone is assigned to each piece of content and then a unique location is assigned to the content on the applicable blockchain ledger. The inaudible tone may be matched with the applicable block chain ledger to perform management and licensing as needed.

In one embodiment, licenses of the content may utilize the originally assigned inaudible tone for reference or another inaudible tone based on the original may be created and utilized to reference a subsequent license. For example, an additional unique identifier including the updated metadata specific to a new license may be assigned a unique inaudible tone to ensure each license is tracked via a unique inaudible tone, metadata, and blockchain update. The copyright information and licensing details may be stored in the inaudible tone data that is associated with the content and stored in the blockchain hash. The utilization of a secure identifier, such as an inaudible tone, and a constantly updated block chain ledger provides content owners and distributors a unique and fail-safe way to protect content.

In one embodiment, each content owners copyrighted material may be registered utilizing the system with the corresponding inaudible tone that may secure the metadata related to the content (not the content itself) and may be registered as a unique hash on the blockchain. In one embodiment, the content metadata may include one or more of a publisher, copyright information, International Standard Recording Code (ISRC), writer/author/artist, performer, composer, producer, engineer, title, album title, release date/year, genre, track number, lyrics/description, length, rhythm, chords, chord progression, art, and so forth.

The illustrative embodiment may be utilized to manage digital content as well as the electronic communications and playback of the content. For example, lawful players, programs, devices, or applications may verify content before allowing access to a user to protect content creators, copyright holders, licensors/licensees, distributors, and other stakeholders. As a result, physical playback of the content is both authorized, monitored, and/or prevented based on the applicable information.

Figure 3:
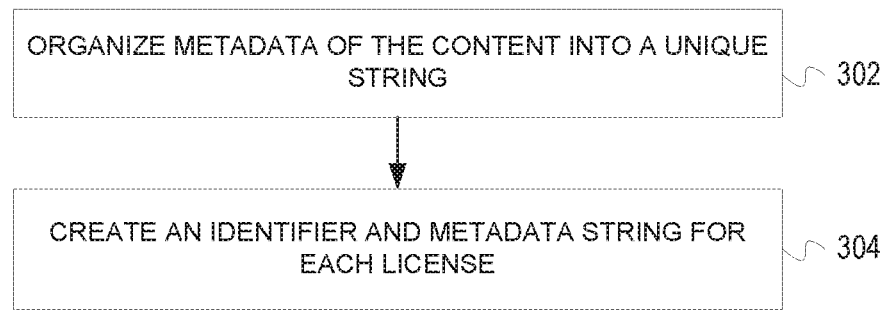
FIG. 3 is a flowchart of a process for tracking metadata for content in accordance with an illustrative embodiment.

FIG. 3 is a flowchart of a process for tracking metadata for content in accordance with an illustrative embodiment. In one embodiment, the process of FIG. 3 may represent one or more steps, such as step 206 of FIG. 2. In one embodiment, the process may begin by organizing metadata of the content into a unique string (step 302). The platform may utilize a permutation formula from a mixed or selective combination of the copyrighted content metadata to organize the unique string. The metadata may describe the content, an applicable license (e.g., individual, group, etc.), license or distribution limitations, restrictions, or requirements, and other applicable information. As previously noted, the unique string may be encompassed in an inaudible tone. In one example, the unique string may be saved as part of a blockchain ledger for subsequent reference.

Next, the platform creates an identifier and metadata string for each license (step 304). In one embodiment, the identifier is an inaudible tone with the metadata for the content and the license embedded. Each metadata string is unique to the license and unique to each licensee of the content. The unique string may represent a licensing key utilized as a secondary means to verify and confirm each copyright license that is unique to the content and license. The identifier and the metadata string may include a cross reference to the unique string created during step 302. The cross-referenced data and licensee terms may be included and tracked in the blockchain ledger and associated updates. The identifier and metadata may be utilized by one or more digital rights management programs, devices, or applications.

Figure 4:
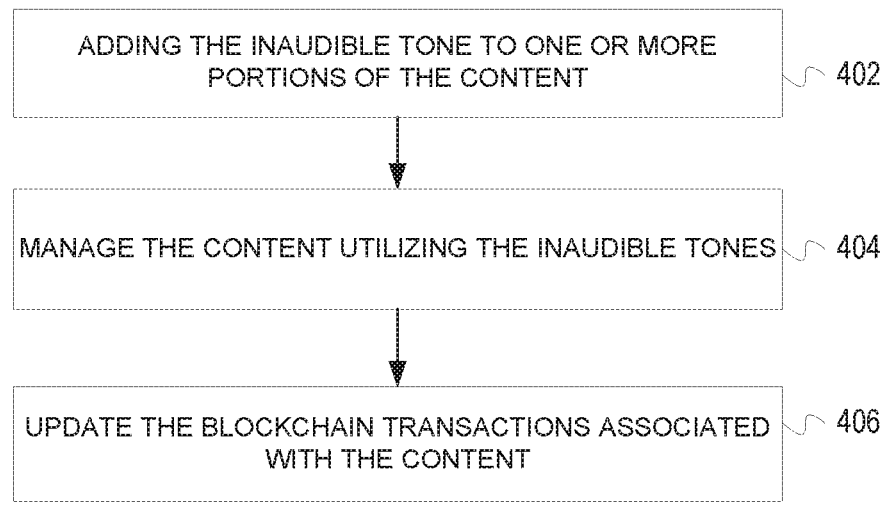
FIG. 4 is a flowchart of a process for utilizing inaudible tones in accordance with an illustrative embodiment.

FIG. 4 is a flowchart of a process for utilizing inaudible tones in accordance with an illustrative embodiment. In one embodiment, the process may begin by adding the inaudible tone to one or more portions of the content (step 402). In one embodiment, the inaudible tone is added to one or more portions of the content at specified intervals, points, or locations. The inaudible tones may be utilized to match copyrighted content, licenses, or so forth. The inaudible tones ensures that there are no duplicated tones within the known spectrum. The inclusion of the embedded inaudible tone at specific intervals along with the unique metadata streams ensure that inaudible tones uniquely identify content, licenses, and transactions. The inaudible tone may also be associated with the content with or without integration.

Next, the platform manages the content utilizing the inaudible tones (step 404). The inaudible tones are one embodiment of a secure identifier and verification key that may be matched to a unique hash on the blockchain for managing the content. Management of the content may include one or more of uploading the content, playback, streaming, embedding, using, extending and receiving compensation, establishing distribution terms, conditions, limitations, and restrictions, licensing the content, and other applicable transactions.

Next, the platform updates the blockchain transactions associated with the content (step 406). The blockchain transactions are tracked in real-time (or near real-time). Transactions are updated to include new licenses and cross-referenced with original inaudible tones with metadata as needed. The licensing rights to managed content may be obtained and confirmed by the content owner or third parties, such as hosting sites, advertisement servers, record labels, distributors, or others utilizing the presence of inaudible tone data associated with the content. The inaudible tone may be used to verify the content is properly licensed via the inaudible tone license key and may verify each license by matching or cross-referencing the secure identifiers (e.g., inaudible tones) utilizing the associated blockchain. For example, ambient listening technologies may retrieve the inaudible tones to verify the associated metadata. Any number of formal or informal auditing processes may be utilized to verify and authenticate content and the associated license. Likewise, the platform may also detect when content has been reproduced or is being utilized without a license.

FIG. 5 is a pictorial representation of a user interface 500 for reviewing content metadata 502 in accordance with an illustrative embodiment. The user interface 500 is one example of a user interface as disclosed in FIG. 1. The user interface 500 may be utilized to upload original content, establish the content metadata, provide copyright information, set licensing terms and restrictions, implement an ambient recognition process, or otherwise present and review applicable information. Any number of fields, database entries, drop-down menus, or other selection components may be associated with the user interface 500 and associated metadata 502. In one embodiment, the metadata 502 may represent links to other pages, windows, or interfaces for receiving applicable information.

The illustrative embodiments provide content owners, licensees, third-party users, social media sites, and others the ability to license, distribute, and manage content. The illustrative embodiments provide a method of managing the content utilizing a blockchain ledger to ensure transactions are properly tracked. One or more secure identifiers, such as inaudible tones, or other markers or indicators ensure that content is performed properly according to a license or other agreement.

The content platform helps resolves the hassles of social media and advertisement server content audits, take down policies, and copyright enforcement which are difficult to track and implement. The content platform facilitates users, owners, and distributors in avoiding the hassle and confusion of improper licensing systems and efforts. The content platform utilizes inaudible tone tagging and hash registration on the blockchain to ensure that a purchased license is properly licensed or owned. The content platform may also track when the applicable license or restrictions are expired, exceeded, or otherwise improper. The content platform may send appropriate notices or alerts regarding expirations, owed monies, license renewals, improper or unauthorized usage of the content, and usage data (e.g., downloads, plays, streams, distribution, etc.).

In one embodiment, the secure identifier, such as an inaudible tone, may be integrated or carried in the content itself. The secure identifier may also be sent along with the secure identifier. A matching tone or the content with the tone is saved in a blockchain ledger/database protected from deletion, tampering and revision to identify, store, share, confirm, and validate the inaudible tone. The blockchain acts as a copyright licensing ledger that keeps record of each original copyright, copyright content metadata, copyright licensing terms, original content, and then tracks each new or updated licensing transaction involving the content in a transparent, traceable, and tamper-proof way.

The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computing system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object-oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (e.g., through the Internet using an Internet Service Provider).

Figure 6:
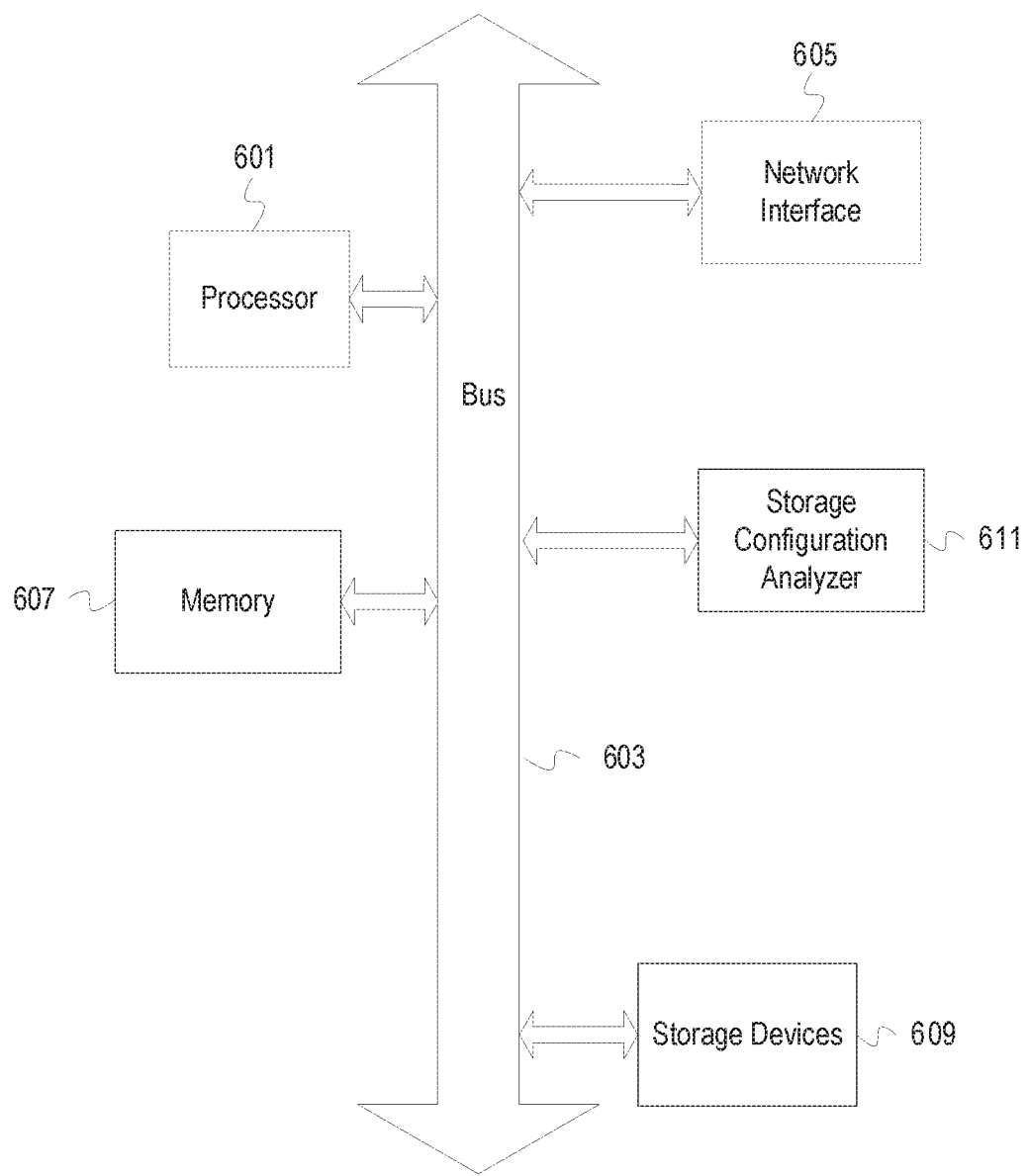
FIG. 6 depicts a computing system in accordance with an illustrative embodiment.

FIG. 6 depicts a computing system 600 in accordance with an illustrative embodiment. For example, the computing system 600 may represent a device, such as one or more of the devices 101 of FIG. 1. The computing system 600 includes a processor unit 601 (possibly including multiple processors, multiple cores, multiple nodes, and/or implementing multi-threading, etc.). The computing system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system also includes a bus 603 (e.g., PCI, ISA, PCI-Express, HyperTransport®, InfiniBand®, NuBus, etc.), a network interface 605 (e.g., an ATM interface, an Ethernet interface, a Frame Relay interface, SONET interface, wireless interface, etc.), and a storage device(s) 609 (e.g., optical storage, magnetic storage, etc.). The system memory 607 embodies functionality to implement embodiments described above. The system memory 607 may include one or more functionalities that store content, blockchain data, parameters, application, user profiles, and so forth. Code may be implemented in any of the other devices of the computing system 600. Any one of these functionalities may be partially (or entirely) implemented in hardware and/or on the processing unit 601. For example, the functionality may be implemented with an application specific integrated circuit, in logic implemented in the processing unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601, the storage device(s) 609, and the network interface 605 are coupled to the bus 603. Although illustrated as being coupled to the bus 603, the memory 607 may be coupled to the processor unit 601.

The features, steps, and components of the illustrative embodiments may be combined in any number of ways and are not limited specifically to those described. In particular, the illustrative embodiments contemplate numerous variations in the smart devices and communications described. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A method for performing content licensing, comprising:
    receiving copyright information associated with content, the copyright information includes at least one or more copyright owners associated with the content and monetization selections associated with one or more copyright owners including content usage restrictions and at least 1) payments or 2) royalty/licensing rates associated with a selected utilization of the content;
    receiving a digital representation of the content;
    assigning one or more secure identifiers consisting of inaudible audio tones to the content prior to any licenses or transactions, wherein the inaudible audio tones are generated by applying hashing algorithms to metadata extracted from the content;
    updating a content library and a blockchain ledger with the content and associated one or more secure identifiers;
    automatically generating and implementing the licenses and transactions for the content utilizing unique identifier for each of the licenses and the transactions, the licenses and transactions are implemented utilizing the monetization selections of the copyright information;
    recording each of the licenses and transactions in the blockchain ledger separately utilizing at least the copyright information, the one or more secure identifiers, and the unique identifier; and
    automatically communicating the content from the content library associated with the licenses and transactions to one or more parties; and
    splitting revenue associated with the licenses and transactions utilizing the copyright information to compensate the one or more owners.

2. The method of claim 1, wherein the content includes audio content and/or visual content.

3. The method of claim 2, wherein the one or more secure identifiers are integrated in multiple portions of the content.

4. The method of claim 1, further comprising:
    searching one or more environments for the secure identifier to ensure compliance with a license for the content.

5. The method of claim 4, further comprising:
    organizing metadata of the content into a unique string;
    creating the unique identifier utilizing the metadata string for each license.

6. The method of claim 5, further comprising:
    saving the secure identifier and the unique identifier with the content in the blockchain ledger.

7. The method of claim 1, further comprising:
    facilitating a copyright filing for the content.

8. The method of claim 1, further comprising:
    compensating the one or more copyright owners utilizing the monetization selections in response to the licenses and the transactions, wherein the content library is accessible through a plurality of networks.

9. The method of claim 1, wherein a pricing algorithm is utilized to provide a price for the content to the one or more copyright owners.

10. A system for performing content licensing, comprising: a plurality of electronic devices executing a content application, the content application is configured to upload content and licensing information associated with the content; a platform accessible by the plurality of wireless devices executing the content application through one or more networks, wherein the platforms receives copyright information associated with content, the copyright information includes at least one or more copyright owners associated with the content and monetization selections associated with one or more copyright owners including at least payments or royalty/licensing rates associated with a selected utilization of the content, assigns one or more secure identifiers to the content prior to any licenses or transactions, the one or more secure identifiers assigned to the content consist of at least one or more inaudible tones, wherein the inaudible audio tones are generated by applying hashing algorithms applied to metadata extracted from the content updates a content library and a blockchain ledger with the content and the content and licensing information, the one or more secure identifiers, and metadata associated with the content, automatically implements licenses and transactions for the content utilizing a unique identifier for each of the licenses and transactions, the licenses and transactions are implemented utilizing the monetization selections of the copyright information associated with the one or more copyright owners, and records the licenses and transactions in the blockchain ledger utilizing at least the copyright information, the one or more secure identifiers, and the unique identifier, and automatically communicate the content from the content library associated with the licenses and transactions.

11. The system of claim 10, wherein the platform remotely accesses the blockchain ledger.

12. The system of claim 10, further comprising:
    one or more remote listening devices that detect the one or more secure identifiers to verify compliance with the license for the content.

13. The system of claim 10, wherein the content includes audio content and/or visual content.

14. The system of claim 10, wherein the platform compensates the one or more copyright owners in response to the licenses and the transactions, and wherein the platform is an integrated portion of a cloud system.

15. The system of claim 10, wherein the platform implements pricing logic for pricing the content for one or more potential licensees or purchasers.

16. A platform implemented method, comprising:
    receiving a digital representation of the content;

receiving copyright information including at least one or more copyright owners associated with the content and monetization information associated with content from the user, the monetization information includes at least payments or royalty/licensing rates each associated with one of a plurality of utilizations of the content;

assigning one or more secure identifiers to the content prior to any licenses or transactions, the one or more secure identifiers consist of at least one or more inaudible tones assigned to the content, the one or more secure identifiers are generated utilizing hashing algorithms applied to metadata of the content;

updating a content library and a blockchain ledger with the content and associated one or more secure identifiers;

implementing licenses or transactions for the content utilizing a unique identifier for each of the licenses or the transactions, the licenses or transactions are implemented utilizing the copyright information and the monetization information received from the one or more copyright owners of the content;

recording the licenses or transactions in the blockchain ledger utilizing at least the copyright information, the one or more secure identifiers, and the unique identifier;

automatically communicating the content from the content library associated with the licenses and transactions;

compensating the copyright owner based on the monetization information in response to the licenses and the transactions; and splitting revenue associated with the licenses and transactions utilizing the copyright information to compensate the one or more owners.

17. The method of claim 16, wherein the licenses or transactions are governed by a smart contract.

18. The method of claim 16, wherein the secure identifier is updated for each licensed version of the content.

19. The method of claim 16, wherein the content represents one or more of songs, audio, performances, records, pictures, written content, drawings, digital content, sheet music, or tablature.

* * * * *